United States Patent [19]

Cho

[11] Patent Number: 4,534,934

[45] Date of Patent: Aug. 13, 1985

[54] AXIAL SWEEP-THROUGH PROCESS FOR PREPARING DIAMOND WIRE DIE COMPACTS

[75] Inventor: Hyun S. Cho, Worthington, Ohio

[73] Assignee: General Electric Company, Worthington, Ohio

[21] Appl. No.: 313,119

[22] Filed: Oct. 20, 1981

Related U.S. Application Data

[63] Continuation of Ser. No. 126,050, Feb. 29, 1980, abandoned.

[51] Int. Cl.$^3$ .......................... B22F 5/00; B22F 7/06; B21K 5/20
[52] U.S. Cl. .......................................... 419/6; 419/11; 419/14; 419/18; 419/47; 76/107 A; 76/DIG. 12; 51/307; 51/309
[58] Field of Search .......................... 75/208 R, 211; 76/107 A, DIG. 12; 428/634; 51/307, 309; 419/5, 6, 11, 14, 18, 38, 47, 51

[56] References Cited

U.S. PATENT DOCUMENTS

| | | | |
|---|---|---|---|
| 3,239,321 | 3/1966 | Blainey et al. | 51/309 |
| 3,293,012 | 12/1966 | Smiley et al. | 51/309 |
| 3,743,489 | 7/1973 | Wentorf et al. | 51/307 |
| 3,745,623 | 7/1973 | Wentorf et al. | 29/45 B |
| 3,831,428 | 8/1974 | Wentorf et al. | 72/467 |
| 3,850,591 | 11/1974 | Wentorf, Jr. | 51/307 |
| 3,879,901 | 4/1975 | Caveney | 51/295 |
| 3,912,500 | 10/1975 | Vereschagin et al. | 75/201 |
| 4,063,909 | 12/1977 | Mitchell | 51/309 |
| 4,246,006 | 1/1981 | Phaal | 51/307 |
| 4,268,276 | 5/1981 | Bovenkerk | 51/295 |

FOREIGN PATENT DOCUMENTS

| | | | |
|---|---|---|---|
| 0001184 | 3/1979 | European Pat. Off. | |
| 0989251 | 4/1965 | United Kingdom | 51/307 |
| 2024843 | 1/1980 | United Kingdom | 72/467 |

*Primary Examiner*—Teddy S. Gron
*Assistant Examiner*—Matthew A. Thexton
*Attorney, Agent, or Firm*—Robert R. Schroeder; Douglas B. Little

[57] ABSTRACT

A process improvement is disclosed for making diamond wire die compacts of the type which are generally described as an inner polycrystalline diamond mass surrounded by and bonded to a mass of metal bonded carbide, such as cobalt cemented tungsten carbide. It is known to make these dies by high pressure-high temperature processes, typical conditions being 50 kbar and temperatures in excess of 1300° C. The improvement comprises disposing within the reaction sub-assembly (e.g. metal carbide and diamond within a zirconium cup) a set of discs of specific materials in specified arrangements. For example, on one side of the mass of metal carbide and diamond is disposed one disc of a diamond catalyst/solvent and one disc of a refractory metal such as molybdenum, and on the other side are disposed at least two discs of one or more transition metals such as zirconium. These discs are generally placed inside the sub-assembly cup. By means of this process modification, process yields have been significantly improved through decreasing the occurrence of defects in the dies and by decreasing the reaction time.

12 Claims, No Drawings

AXIAL SWEEP-THROUGH PROCESS FOR PREPARING DIAMOND WIRE DIE COMPACTS

This is a continuation of application Ser. No. 126,050 filed Feb. 29, 1980, now abandoned.

TECHNICAL FIELD

This invention is related to processes for sintering diamond particles. More particularly, it deals with an improved high pressure-high temperature process for manufacturing diamond wire die compacts.

BACKGROUND

A diamond compact is a polycrystalline mass of diamond particles bonded together to form an integral, tough, coherent, high-strength mass having a diamond concentration of at least 70 volume percent. Representative U.S. patents on the subject of diamond compacts are: U.S. Pat. Nos. 3,136,615; 3,141,746; 3,239,321; 3,609,818; 3,744,982; 3,816,085; 3,913,280 and 3,944,398. A composite compact is a compact bonded to a substrate material, such as cemented tungsten carbide (see U.S. Pat. Nos. 3,745,623 and 4,063,909). Compacts may be used as blanks for cutting tools, dressing tools, and wear parts.

U.S. Pat. Nos. 3,831,428; 4,129,052 and 4,144,739 disclose wire drawing dies made with diamond compacts. A diamond wire die compact comprises an inner mass of polycrystalline diamond (as described above under the term compact) which inner mass is surrounded by and bonded to a mass of metal bonded carbide, such as cobalt cemented tungsten carbide.

The actual wire die is fabricated in a variety of ways and generally involves fitting or securing the wire die compact within a high strength metal ring and forming the wire drawing hole through the center of the polycrystalline diamond section using means well known in the art, such as a laser. The hole could then be finished by drawing a wire impregnated with diamond dust back and forth through the hole. The hole may be preformed during the high pressure-high temperature sintering process if the teaching of U.S. Pat. No. 3,831,428 at column 4 lines 54–60 and FIG. 4 is followed (predisposing a wire through the polycrystalline core which wire may be later removed by dissolving it in a suitable acid).

Dietrich South African Patent Application No. 77/5521 discloses a diamond wire die compact provided with a tantalum liner bonding the carbide annulus to the central polycrystalline diamond core. Dietrich claims that the tantalum layer effectively bonds the diamond core to the carbide surrounding it.

Both the Wentorf (U.S. Pat. No. 3,831,428) wire die compacts and those of Dietrich are made under high pressure-high tenmperature sintering processes in which a catalytic metal such as cobalt infiltrates radially from the surrounding metal carbide annulus or cylinder (so called sweep-through process). This catalyst accelerates the sintering process leading to extensive diamond-to-diamond bonding. The diamond compact quality is dependent upon the degree of diamond-to-diamond bonding in the microstructure. This bonding seems to be attainable when uniform and sufficient amount of cobalt is introduced into the grain boundaries during high pressure-high temperature (HP/HT) conditions with other factors being constant.

The major problem in making large size (e.g. 24 mm diameter) compact die blanks is the inefficiency of cobalt diffusion by a conventional radial sweep-through technique. Radial diffusion has been found to be inadequate to provide the desired cobalt concentration throughout the diamond core.

The research which led to the present invention was in an effort to improve the catalyst diffusion in the larger size die blanks and to decrease the percentage of defective blanks which result from the known processes. Defects occur mainly in the form of both poorly bonded areas in the diamond core and cracking in the diamond or in the metal carbide section. Cracking occurs erratically during various manufacturing operations, such as pressing, grinding of the outside diameter, surface grinding, lapping, and even under static conditions, making detection of the cause very difficult. Defects are also detected by x-radiographic examination. A secondary objective was to apply any successful technique to die blanks of smaller size.

DISCLOSURE OF INVENTION

The objectives stated above have been accomplished through the employment of axial catalyst diffusion in the HP/HT manufacturing process in addition to the conventional radial sweep-through technique. The preferred method of axial cobalt diffusion is by means of a layer of cobalt combined with a refractory metal layer (e.g. molybdenum, tantalum or tungsten). However, the addition of axial cobalt without a refractory metal is also an improvement over the tantalum liner method of Deitrich in some cases. With this technique, making the larger size diamond compact die blank (24.1 mm outside diameter (O.D.) and 12.0 mm inside diameter (I.D.)) was accomplished with more favorable yields than the prior art technique. The new method produces a uniform concentration as well as supplying sufficient cobalt infiltrant.

The known process steps and parameters for preparing diamond wire die compacts comprise subjecting a mass comprised of a metal carbide cylinder having at least one hole extending through its thickness connecting the two ends and containing diamond particles in said holes to the following high pressure-high temperaure sintering conditions: pressure of at least 50 kbar (kilobars) at a temperature of at least 1300° C. and within the diamond stable region; reaction time of 10–90 minutes; and all of this being performed in a high pressure reaction cell containing the diamond particles and the metal carbide within a sub-assembly comprising a shield metal cup and a shield metal disk which covers the open end of the cup. The shield metal may be selected from zirconium, titanium, tantalum, tungsten, and molybdenum metals.

The diamond stable region is the range of pressure temperature conditions under which diamond is thermodynamically stable. On a pressure temperature phase diagram, it is generally the high pressure side, above the equilibrium line between diamond and graphite.

The improvement comprises disposing on one side of the mass of metal carbide and diamond one disc comprised of a diamond catalyst/solvent and one disc of a refractory metal, each of said discs having a thickness of 25–102 microns. Usually, at least two discs of one or more transition metals (e.g. zirconium, titanium, tantalum, tungsten or molybdenum) are disposed on the end of the mass of metal carbide and diamond opposite the side on which the catalyst/solvent disc is disposed. These added discs are usually within the sub-assembly defined by the shield metal cup and disc.

BEST MODE FOR CARRYING OUT THE INVENTION

One preferred form of a HP/HT apparatus (although others exist) in which the improved process of this invention may be performed is the subject of U.S. Pat. No. 2,941,248 (incorporated herein by reference) which is called a belt apparatus. It includes a pair of opposed cemented tungsten carbide punches and an intermediate belt or die member of the same material. The die member includes an aperture in which there is positioned a reaction vessel shaped to contain a charge assembly or reaction cell. Between each punch and the die there is a gasket assembly comprising a pair of thermally insulating and electrically nonconducting pyrophyllite members and an intermediate metallic gasket.

The reaction cell, in one preferred form, includes a hollow salt cylinder. The cylinder may be of another material, such as talc, which (1) is not converted during HP/HT operation to a stronger, stiffer state (as by phase transformation and/or compaction) and (b) is substantially free of volume discontinuities occurring under the application of high temperatures and pressures, as occurs, for example with pyrophyllite and porous alumina. Materials meeting other criteria set forth in U.S. Pat. No. 3,030,662 (Col. 1, 1.59–Col. 2, 1.2, incorporated by reference herein) are useful for preparing the cylinder.

Positioned concentrically within and adjacent to the salt cylinder is a graphite electrical resistance heater tube which extends beyond the salt cylinder at both ends. Within the graphite heater tube, there is concentrically positioned a cylindrical salt liner. The ends of the liner are fitted with salt plugs disposed at the top and the bottom. The ends of the graphite heater tube are fitted inside with pyrophyllite plugs and outside with pyrophyllite rings which fill the space from the ends of the salt cylinder to the end of the graphite heater tube.

Electrically conductive metal end discs are utilized at each end of the reaction cell to provide electrical connection to the graphite heater tube. Adjacent to each metal end disc is an end cap assembly each of which comprises a pyrophyllite plug or disc surrounded by an electrically conducting ring.

Operational techniques for simultaneously applying both high pressures and high temperatures in this type of apparatus are well known to those skilled in the super-pressure art. The charge assembly fits within the space defined by the salt liner and the salt plugs. The assembly consists of a cylindrical sleeve of shield metal. Within the shield metal sleeve is one or more subassemblies. The mass of diamond particles placed within the sub-assembly may also contain graphite and up to 2.5 weight percent catalyst/solvent. The mass of diamond grains is disposed within one or more cavities or holes through a disc made of cold pressed sinterable carbide powder (mixture of carbide powder and appropriate metal bonding medium therefore). If just one die is made per sub-assembly, there is only one such hole which is usually concentric with the metal carbide disc which forms an annulus around the diamond core. If desired, the annulus or disc may be made of presintered metal bonded carbide or fully sintered metal bonded carbide.

It is also feasible to make diamond wire die compacts solely by means of the axial diffusion technique. A metal carbide free of any catalytic metals (e.g. cobalt) would be used. In that case, radial sweep through of the solvent/catalyst would not be available, and all of it would be furnished by means of the axial diffusion technique.

The charge assembly is loaded into the reaction vessel which is placed in the HP/HT belt apparatus. First, the pressure and then the temperature are increased and held at the desired conditions for sufficient time for sintering to occur. The sample is then allowed to cool under pressure for a short period of time (e.g. 3 minutes), and finally the pressure is decreased to atmospheric pressure (which may take about one minute), and the compact is recovered.

The shield metal sleeve can be manually removed. Any adhering metal from the shield metal cup or disc can be ground or lapped off. Distortion or surface irregularity may be removed in the same manner.

The metal carbide may be selected from tungsten, titanium, or tantalum carbides; and the material providing the metal bond in the cemented carbide (bonding medium) may be selected from the group consisting of cobalt, nickel, iron, chromium, and mixtures thereof. Cobalt cemented tungsten carbide is preferred.

The catalyst/solvent may be selected from the group consisting of cobalt, iron, nickel, ruthenium, rhodium, palladium, platinum, chromium, manganese, and mixtures of these materials. Cobalt, iron, and nickel are preferred, cobalt being the most preferred.

Of the refractory metals, those which are preferred for use in the discs of this process improvement are: molybdenum, tantalum, tungsten, zirconium, and titanium.

Of the transition metals, zirconium is preferred for use in the transition metal discs of this process improvement.

A typical size range for the diamond particles used as a raw material in making diamond compact wire dies is from 0.1 to 150 microns in largest dimension. The finer sizes are preferred (0.1–45 microns) for the dies used to draw wire where a fine finish is needed on the wire.

Many experiments were performed to optimize the number of the various discs and other arrangement as will be shown by the sampling given in Table 1 which follows. In that table and from this point on the term yield is defined as the number of finished blanks without defects divided by the total number of blanks pressed. The symbol used to represent the configuration of the sub-assembly represents a cross sectional outline view as follows:

```
┌─────────┐────Zirconium Shield Metal Disc
│  ┌───┐  │────Diamond Particles
│ ─┤   ├─ │────Cobalt Cemented Tungsten Carbide Ring
│  └───┘  │
└─────────┘────Zirconium Shield Metal Cup
```

Preferably, the shield metal cap is crimped over the shield metal disc, as indicated by the above symbol.

TABLE 1

| Various Sub-assembly Configurations | | |
|---|---|---|
| Configuration | Yield | Process Reliability |
| 1 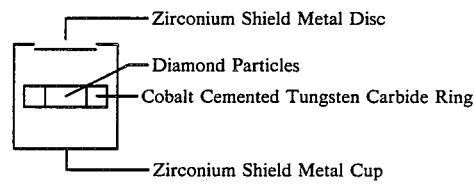 | 40–60% | Inconsistent and Unreliable |

TABLE 1-continued

| Configuration | | Yield | Process Reliability |
|---|---|---|---|
| 2 | Zr / Co / ▯▯▯ / Co / Zr | 50–70% | Inconsistent |
| 3 | Mo / Co / ▯▯▯ / Co / Mo | 90–100% | Reliable and Reproducible |
| 4 | Mo / Co / ▯▯▯ / Zr / Zr | 90–100% | Reliable and Reproducible |
| Standard Process of U.S. Pat. No. 3,831,428 | | 50–70% | |

The results in Table 1 are from HP/HT experiments making diamond wire die compacts having the following nominal dimensions: 13.7 mm outside diameter, 5.1 mm diamond core diameter, and 3.8 mm thickness. All of the discs used were about 50 microns thick. The best success was obtained with Configurations 3 and 4.

For the larger diameter dies, it has been found desirable to use eight additional zirconium discs on the top (i.e. on top of the molybdenum disc) and a total of eight zirconium discs on the opposite side of the metal carbide and diamond mass.

Another variation has also been used successfully:

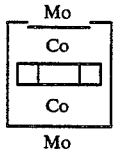

This configuration is at variance with the sub-assembly described in the previous paragraphs in that two catalyst/solvent discs have been used, one on either side of the metal carbide. Also, the transition metal chosen is molybdenum rather than zirconium, and it is placed outside the shield metal cup. In addition, molybdenum has been chosen for the refractory metal disc, and it has been placed outside the shield metal disc.

Configuration No. 4 with the addition of one more zirconium disc on the bottom inside the shield metal cup has been found to be the optimum configuration.

In making wire die blanks tungsten carbide cracking at the press has been reduced from 5–20% (with the tantalum liner process) to 5–10% using this process improvement, and overall blank cracking rate has been reduced from 30% to 20%. In addition, the improved process can be run in a shorter time period (75 minutes at HP/HT conditions versus 90 minutes typical for the tantalum liner process) which results in an increased production rate. Also, the lapping time has been significantly reduced. The Knoop hardness of the diamond core of these large die compacts made by the improved process has been found to be virtually equivalent to that of compacts made by the tantalum liner process.

In experiments on 13.7 mm outside diameter compacts, Knoop hardness was found to be equivalent to somewhat lower than that of compacts made by the process of U.S. Pat. No. 3,831,428, but the difference was not great enough to affect die performance. In those experiments X-ray rejections were also reduced from 10–30% to 5–10%, and the cracking rate of blanks out of the press was reduced from 15–35% to 0–5%.

There have been promising results also with the smaller (e.g. 0.89 mm diamond core diameter) going from 67% yield with the process of U.S. Pat. No. 3,831,428 to 95% yield with axial cobalt diffusion.

Other embodiments of this invention will be apparent to those skilled in the art from a consideration of this specification or practice of the invention disclosed herein. It should be understood that there may be other embodiments which fall within the spirit and scope of the invention as defined by the following claims.

What is claimed is:

1. An improved process for preparing diamond wire die compacts characterized by diamond-to-diamond bonding which comprises subjecting at least one mass comprised of a metal carbide cylinder having at least one hole extending through its thickness connecting the two ends and containing diamond particles in said holes to the following high pressure-high temperature sintering conditions:

pressure of at least 50 kbar at a temperature of at least 1300° C. and within the diamond stable region; and reaction time of 10–90 minutes;

in a high pressure reaction cell containing each mass of metal carbide and diamond particles within a sub-assembly comprising a shield metal cup and a shield metal disc covering the open end of the cup; wherein the improvement comprises using a sub-assembly in which has been placed on one end of the mass of metal carbide and diamond a layer comprised of a diamond catalyst/solvent whereby axial diffusion of the catalyst/solvent into the diamond is achieved.

2. The improved process as recited in claim 1 wherein:
(a) the metal carbide is selected from the group consisting of tungsten, titanium, and tantalum carbides; and
(b) the catalyst/solvent is selected from the group consisting of cobalt, iron, nickel, ruthenium, rhodium, palladium, platinum, chromium, manganese, and mixtures thereof.

3. The improved process as recited in claim 2 wherein the metal carbide already contains a metal bonding material selected from the group consisting of cobalt, nickel, iron, chromium, and mixtures thereof.

4. The process improvement as recited in claim 3 wherein the size of the diamond particles ranges from 0.1 to 75 microns in largest dimension and the metal carbide is cobalt cemented tungsten carbide.

5. An improved process for preparing diamond wire compacts comprising subjecting at least one mass comprised of a metal carbide cylinder having at least one hole extending through its thickness connecting the two ends and containing diamond particles in said hole to a high pressure-high temperature process which results in a compact characterized by diamond-to-diamond bonding which process is performed in a high pressure reaction cell containing each mass of metal carbide and diamond particles within a sub-assembly comprising a shield metal cup and a shield metal disc covering the open end of the cup; wherein the improvement comprises using a sub-assembly in which has been placed on one end of the mass of metal carbide and diamond a composite layer comprised of a diamond catalyst/solvent combined with a refractory metal, whereby axial diffusion of the catalyst/solvent into the diamond is achieved.

6. The improved process of claim 5 wherein the metal carbide contains a metal bonding material selected from the group consisting of cobalt, nickel, iron, chromium, and mixtures thereof.

7. The improved process of claim 6 wherein said composite layer comprises a catalyst/solvent layer adjacent to said mass of metal carbide and diamond, and a layer of said refractory metal adjacent to said catalyst/solvent layer on its side opposite of said mass.

8. The improved process of claim 6 wherein:
(a) the metal carbide is selected from the group consisting of tungsten, titanium, and tantalum carbide;
(b) the catalyst/solvent is selected from the group consisting of cobalt, iron, nickel, ruthenium, rhodium, palladium, platinum, chromium, manganese, and mixtures thereof; and
(c) the refractory metal is selected from the group consisting of molybdenum, tantalum, tungsten, zirconium, and titanium.

9. The improved process of claim 6 wherein a layer of refractory metal is disposed adjacent to the side of said mass of metal carbide and diamond particles opposite from said composite layer.

10. The improved process of claim 7 wherein each said sub-assembly contains in the following sequential order: a layer of said refractory metal, said diamond catalyst/solvent, said mass of metal carbide and diamond particles, a second layer of said diamond catalyst/solvent, and a second layer of said refractory metal.

11. The improved process of claim 9 wherein said diamond catalyst/solvent is cobalt, said composite layer refractory metal is molybdenum, and said opposite side refractory metal is zirconium.

12. The improved process of claim 7 wherein said layer of said catalyst/solvent is a disc thereof and said layer of said refractory metal is a disc thereof.

* * * * *